C. E. DAVIS.
POWER TRANSMISSION UNIT FOR AUTOMOBILES.
APPLICATION FILED APR. 11, 1910.

1,024,121.

Patented Apr. 23, 1912.

2 SHEETS—SHEET 1.

Witnesses
Frank A. Fahll
Thomas W. McMeans

Inventor
Charles Ethan Davis,
By Bradford Hood
Attorneys

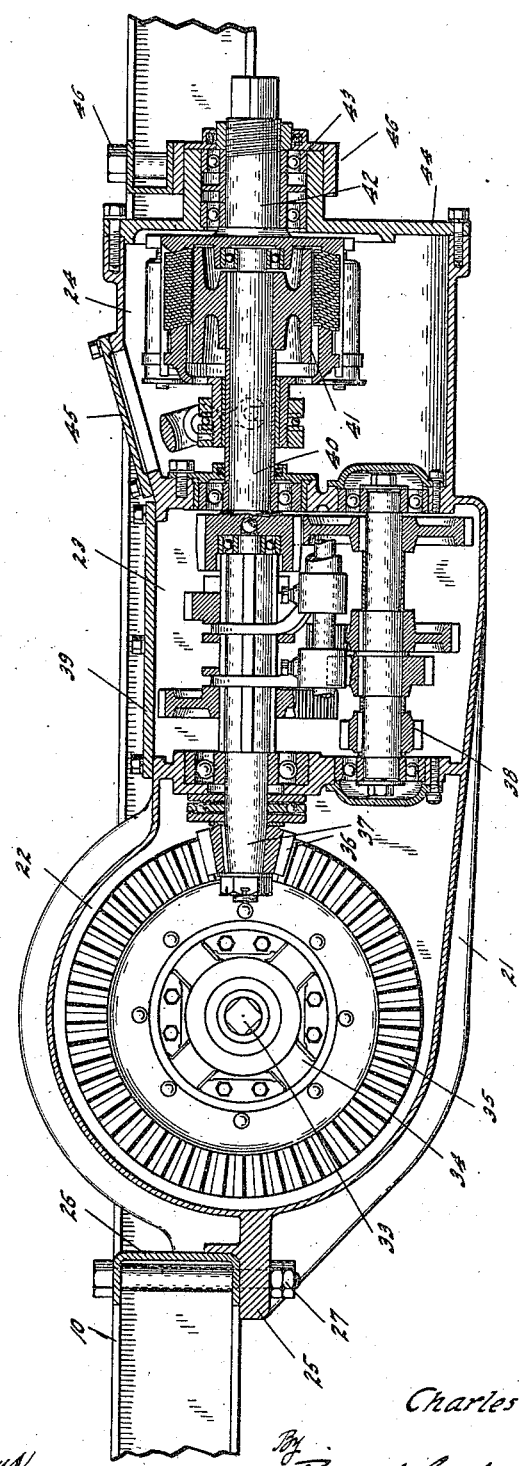

UNITED STATES PATENT OFFICE.

CHARLES ETHAN DAVIS, OF MUNCIE, INDIANA, ASSIGNOR TO WARNER GEAR COMPANY, OF MUNCIE, INDIANA; A CORPORATION OF INDIANA.

POWER-TRANSMISSION UNIT FOR AUTOMOBILES.

1,024,121.  Specification of Letters Patent.  Patented Apr. 23, 1912.

Application filed April 11, 1910. Serial No. 554,679.

*To all whom it may concern:*

Be it known that I, CHARLES ETHAN DAVIS, a citizen of the United States, residing at Muncie, in the county of Delaware and State of Indiana, have invented a new and useful Power-Transmission Unit for Automobiles, of which the following is a specification.

In the operation of automobiles, more especially heavy trucks of the chain-driven or jack-shaft type, it is found that considerable time is lost in making repairs to the power-transmitting connections between the motor and the traction wheels, because the various constructions now in use are such that these connections cannot be readily withdrawn and new ones substituted without considerable delay.

The object of my present invention is to produce a construction in which the power-transmitting mechanism, *i. e.* the clutch, speed-changing and direction-changing gearing, and differential gearing interposed between the motor and the traction wheels may be constructed as a unit which may be readily inserted or withdrawn as a whole without disturbing either the traction wheels or the motor so that, in case of needed repair such unit may be very quickly withdrawn and an identical unit quickly substituted.

The accompanying drawings illustrate my invention.

Figure 1:
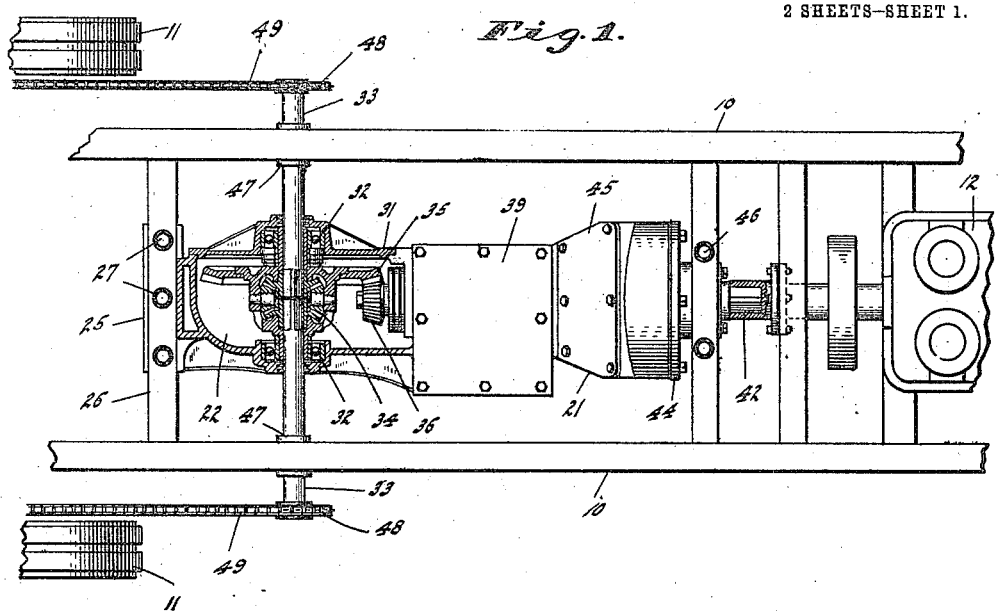
Figure 3:
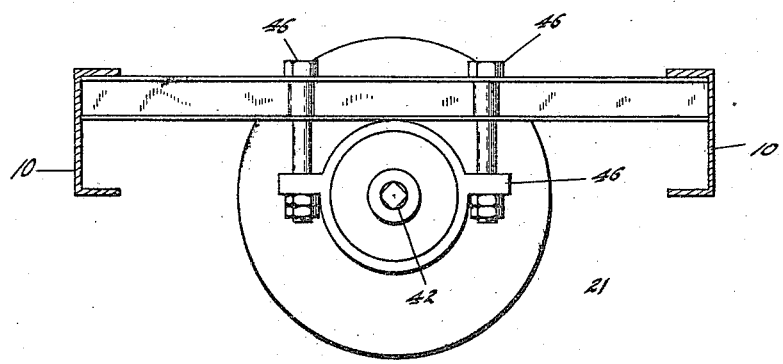

Figure 1 is a plan of a chassis embodying my invention with the transmission unit in partial horizontal section; Fig. 2 a longitudinal vertical section of an embodiment of my transmitting unit; Fig. 3 a front elevation, showing one form of suspension for the forward end of the unit.

In the drawings, 10 indicates the main frame of the chassis supported at its rear end by the traction wheels 11, 11 and carrying, in any suitable manner, a motor 12.

As previously stated, the object of my invention is to produce a unit structure which may be readily standardized for insertion between the motor and the traction wheels in such way that it may be very readily withdrawn and replaced, said unit structure embodying all of the transmission elements which are necessarily associated and which are liable to need repair or replacement in such manner as to require material time or labor. For that reason I provide a casing 21 which is preferably a single casting having a differential chamber 22, a transmission chamber 23 and a clutch chamber 24. At one end, the casing 21 is provided with a bracket or extension 25 which is preferably upwardly presented and this extension is adapted to be connected, rigidly or otherwise, to a member 26 of the main frame by means of suitable bolts 27 or other suitable readily removable retaining members.

Access to the differential chamber is provided by a removable plate 31 and suitable bearings 32 are provided to support the inner ends of shaft sections 33, 33 which are connected by suitable differential gearing 34, the main gear 35 of which meshes with a pinion 36 carried by the power-delivering shaft 37 of a suitable speed varying gearing 38 mounted in chamber 23. Access to the chamber 23 is provided by means of a suitable removable cover member 39. The power-receiving shaft 40 of the speed-varying gearing is extended forwardly into the clutch chamber 24 and a suitable clutch 41 is arranged between this shaft 40 and the primary power-receiving shaft 42 which is journaled in suitable bearings 43 carried by a removable head plate 44 arranged to close the forward open end of the casing 21. Access to chamber 24 may be had by removing the cover plate 45. The forward end of shaft 42 is arranged for connection, either direct or indirect, with the motor 12. The forward end of casing 21 is supported from the main frame, or other supporting member, by means of a suitable readily movable connection 46. In the form shown, the shafts 33, 33 form a jack shaft, the outer ends being supported in suitable bearings 47 carried by the main frame and carrying sprocket wheels 48 connected by suitable chains 49 with the traction wheels of the vehicle.

With a construction of this kind it will be noted that, in case of any difficulty whatever with the power-transmitting train between the motor and the shaft 31, the entire structure comprising casing 21 and all its associate parts, may be dropped away from the main frame as a unit by merely loosening the bolts 27 and 46 and withdrawing the shaft sections 33 endwise until they are withdrawn from the casing. Thereupon a duplicate of the power-transmitting unit may be immediately inserted so that a defective unit may be taken to a shop for repair while the automobile proceeds to work. By such an arrangement it becomes possible to practically permanently locate the various supply pipes, etc., connected with the motor and to repair and replace the power-transmitting unit without disturbing these connections and without any loss of time beyond the very short time required to withdraw one unit and insert a new one.

It will be readily understood that the details of arrangement and mounting of the various elements of the power-transmitting train may be modified to a very considerable extent without departing from my invention.

I claim as my invention:

1. In an automobile, the combination with the main frame, of a transmission unit comprising a suitable supporting frame and carrying clutching mechanism, transmission mechanism, and differential mechanism, said differential mechanism being formed to receive two readily removable shafts and the said unit presenting at its clutch end a shaft for attachment to a motor, and means for supporting said unit upon the frame independent of the shafts.

2. A transmission unit for automobiles, comprising an inclosing casing within which are mounted clutching mechanism, transmission mechanism, and differential mechanism connected in series, the said clutching mechanism presenting at one end of the unit a member for connection with a motor and the differential mechanism presenting at opposite sides of said unit portions to receive readily detachable shafts, and means associated with said unit by which it may be secured in place on the frame of an automobile independent of said shafts.

In witness whereof, I have hereunto set my hand and seal at Muncie, Indiana, this 1st day of April, A. D. one thousand nine hundred and ten.

CHARLES ETHAN DAVIS. [L. S.]

Witnesses:
  W. H. CHURCH,
  E. B. BALTZLER.

---

Copies of this patent may be obtained for five cents each, by addressing the "Commissioner of Patents, Washington, D. C."